US012801833B2

(12) United States Patent
Lyu et al.

(10) Patent No.: US 12,801,833 B2
(45) Date of Patent: Nov. 17, 2026

(54) TEXT ERROR CORRECTION METHOD, SYSTEM, DEVICE, AND STORAGE MEDIUM

(71) Applicant: CHINA UNICOM (GUANGDONG) INDUSTRIAL INTERNET CO., LTD., Guangzhou (CN)

(72) Inventors: Zhaobiao Lyu, Guangzhou (CN); Chengchong Xu, Guangzhou (CN); Jianfeng Li, Guangzhou (CN); Qing Xiao, Guangzhou (CN); Liping Zhou, Guangzhou (CN)

(73) Assignee: CHINA UNICOM (GUANGDONG) INDUSTRIAL INTERNET CO., LTD., Guangzhou (CN)

( * ) Notice: Subject to any disclaimer, the term of this patent is extended or adjusted under 35 U.S.C. 154(b) by 333 days.

(21) Appl. No.: 18/397,510

(22) Filed: Dec. 27, 2023

(65) Prior Publication Data

US 2024/0135089 A1 Apr. 25, 2024

Related U.S. Application Data

(63) Continuation of application No. PCT/CN2023/078708, filed on Feb. 28, 2023.

(30) Foreign Application Priority Data

Apr. 7, 2022 (CN) ........................ 202210360845.6

(51) Int. Cl.
*G06F 40/166* (2020.01)
*G06F 40/20* (2020.01)

(52) U.S. Cl.
CPC ........... *G06F 40/166* (2020.01); *G06F 40/20* (2020.01)

(58) Field of Classification Search
CPC ........ G06F 40/166; G06F 40/20; G06F 40/30; G10L 15/26; G10L 2015/025; G10L 15/02
See application file for complete search history.

(56) References Cited

U.S. PATENT DOCUMENTS

2002/0188446 A1* 12/2002 Gao ...................... G06F 40/216 704/E15.009
2004/0148169 A1* 7/2004 Baker .................. G10L 15/065 704/254

(Continued)

FOREIGN PATENT DOCUMENTS

CN 111523306 A 8/2020
CN 113129865 A 7/2021

(Continued)

OTHER PUBLICATIONS

International Search Report dated Jun. 5, 2023, in International Application No. PCT/CN2023/078708.

(Continued)

*Primary Examiner* — Wilson W Tsui
(74) *Attorney, Agent, or Firm* — MUNCY, GEISSLER, OLDS & LOWE, P.C.

(57) ABSTRACT

A text error correction method includes splitting a text obtained by automatic speech recognition into short sentences; inputting each of the short sentences into a trained error correction model, respective parameters in each layer of the model are synchronously updated during training thereof; acquiring phoneme information by the phoneme extractor; converting the phoneme information into a phoneme feature by the phoneme feature encoder; obtaining a language feature by the language feature encoder, combining the phoneme feature and the language feature to obtain a combined feature by the feature combination module; decoding the combined feature to correct an error of the (Continued)

short sentence by the decoder, determining first perplexity and second perplexity of the short sentence, comparing the two kinds of perplexity to determine a correct text of the short sentence, and combining the correct texts of all of the short sentences in order into a correct text.

8 Claims, 8 Drawing Sheets

(56) References Cited

U.S. PATENT DOCUMENTS

| | | | | |
|---|---|---|---|---|
| 2006/0206313 | A1* | 9/2006 | Xu | G06F 40/242<br>704/10 |
| 2019/0080688 | A1* | 3/2019 | Itsui | G10L 15/197 |
| 2021/0097242 | A1* | 4/2021 | Yoon | G06F 40/44 |

FOREIGN PATENT DOCUMENTS

| | | | |
|---|---|---|---|
| CN | 114091437 | A | 2/2022 |
| CN | 114282523 | A | 4/2022 |
| CN | 114495910 | A | 5/2022 |
| JP | 2014077882 | A | 5/2014 |
| WO | WO2018120889 | A1 | 7/2018 |

OTHER PUBLICATIONS

First Examination Report dated May 24, 2022, in Chinese Application No. 202210360845.6.

Second Examination Report dated Jun. 17, 2022, in Chinese Application No. 202210360845.6.

* cited by examiner

TEXT ERROR CORRECTION METHOD, SYSTEM, DEVICE, AND STORAGE MEDIUM

CROSS REFERENCE TO RELATED APPLICATIONS

The present application is a continuation of International Application No. PCT/CN2023/078708, filed on Feb. 28, 2023, which claims priority from Chinese Patent Application No. 202210360845.6 filed on Apr. 7, 2022, all of which are hereby incorporated herein by reference.

TECHNICAL FIELD

The present invention relates to a field of text error correction, and more specifically, relates to a text error correction method, a system, a device, and a storage medium.

BACKGROUND

Automatic speech recognition (ASR) is a basic task of intelligent speech in natural language processing, which can be widely used in scenarios such as an intelligent customer service and an intelligent outbound call. However, in the automatic speech recognition task, the speech recognition result is often not terribly accurate, for example, the recognized text contains some errors such as typographical errors, and errors of extra characters and missing characters. Therefore, error correction on the automatic speech recognition result is also a key task for a downstream natural language processing service.

The current text error correction method in the related art is generally in form of pipeline processing, which generally includes three sequential steps of detecting errors, recall candidate words, and sorting candidate words. The step of detecting errors includes detecting and locating erroneous points in the text, the step of recalling candidate words includes recalling correct candidate words at the erroneous points, and the step of sorting candidate words includes scoring and sorting the recalled candidate words by a sorting algorithm, and then selecting the candidate word with a highest score/in first order to replace the word/character at the erroneous points. In such solution, the mentioned three steps are implemented by three independent models, such pipeline processing method inevitably causes the model downstream to be strongly dependent on results of the model upstream, as a result, an error occurs in a certain model may continuously accumulate in the downstream model, causing a larger error in the final result. It is assumed that model accuracy rate of each model is indicated as $A_1$, $A_2$, and $A_3$, the final error correction accuracy rate thus is $A_1 \times A_2 \times A_3$, in this situation, if the accuracy rates of $A_1$, $A_2$, and $A_3$, are all 90%, only 73% final accuracy can be obtained.

SUMMARY OF INVENTION

It is therefore an object of the present invention to provide a text error correction method, a system, a device, and a storage medium, which can resolve a problem that error accumulation is likely to occur in the existing text error correction solution in the related art, resulting in a large error in the final result.

In a first aspect, the present invention provides a text error correction method, including steps of: splitting a text obtained by automatic speech recognition into short sentences; and executing the following operations on each of the short sentences: inputting the short sentence into a trained error correction model, the error correction model including a phoneme extractor, a phoneme feature encoder, a language feature encoder, a feature combination module, and a decoder, and the phoneme extractor, the phoneme feature encoder, the language feature encoder, the feature combination module, and the decoder synchronously updating respective parameters thereof during training of the error correction model by inputting a text sample into the error correction model, acquiring phoneme information of the short sentence by the phoneme extractor, converting the phoneme information into a phoneme feature by the phoneme feature encoder encoding the phoneme information, obtaining a language feature of the short sentence by the language feature encoder encoding the short sentence, combining the phoneme feature and the language feature to obtain a combined feature by the feature combination module, decoding the combined feature to correct an error of the short sentence by the decoder, and obtaining a short sentence after error correction, determining text perplexity of the short sentence after error correction as first perplexity, determining text perplexity of the short sentence before error correction as second perplexity, comparing the first perplexity and the second perplexity of the short sentence to determine the short sentence before error correction or the short sentence after error correction as a correct text of the short sentence, and combining the correct texts of all of the short sentences in order into a correct text.

In a second aspect, the present invention provides a text error correction system, including: a text preprocessing module; an error correction model; a determination model; and a text combination module, in which the text preprocessing module is configured to split a text obtained by automatic speech recognition into short sentences, and input the short sentences to a trained error correction model, the error correction model includes a phoneme extractor, a phoneme feature encoder, a language feature encoder, a feature combination module, and a decoder, the phoneme extractor, the phoneme feature encoder, the language feature encoder, the feature combination module, and the decoder synchronously update respective parameters thereof during training of the error correction model by inputting a text sample into the error correction model, the phoneme extractor is configured to acquire phoneme information of each of the short sentences, and input the phoneme information of the short sentence into the phoneme feature encoder, and is further configured to directly input each of the short sentences into the language feature encoder and the determination model, the phoneme feature encoder is configured to encode the phoneme information of each of the short sentences to convert the phoneme information of the short sentence into a phoneme feature of the short sentence, the language feature encoder is configured to encode each of the short sentences to obtain a language feature of the short sentence, the feature combination module is configured to combine the phoneme feature and the language feature of each of the short sentences to obtain a combined feature of the short sentence, and input the combined feature of each of the short sentences into the decoder, the decoder is configured to decode the combined feature of each of the short sentences to correct an error of the short sentence to obtain a short sentence after error correction, and is further configured to input the short sentence after error correction into the determination model, the determination model is configured to determine text perplexity of the short sentence after error correction as first perplexity of the short sentence, and determine text perplexity of the short sentence before error correction as second perplexity of the short sentence, and is further configured to compare the first perplexity and the second perplexity of each of the short sentences to determine the short sentence before error correction or the short sentence after error correction as a correct text of the short sentence, and the text combination module is configured to combine the correct texts of all of the short sentences in order into a correct text.

In a third aspect, the present invention provides a computer device including a storage and a processor, in which the storage stores a computer program, and the processor implements the text error correction method described above when executing the computer program. The present invention also provides a computer-readable storage medium storing a computer program, in which the text error correction method described above is implemented when the computer program is executed by a processor.

Compared with the related art, the present invention can obtain some beneficial effects.

According to the text error correction method of the present invention, by integrating the functional modules of phoneme extraction, phoneme encoding, language encoding, feature fusion, and decoding into one error correction model, parameters of respective levels of the model can be synchronously updated when the model is trained, so that an error in an upper-layer structure can be corrected in downstream training, and a problem of error accumulation during the processing on short sentences in a multi-level structure can be resolved. At the same time, the method according to the present invention further includes comparing the text perplexity of the short sentence before error correction and the short sentence after error correction, which is used to deal with a situation where the short sentence after error correction does not read smoothly due to an error in the error correction model itself, and the comparison based on the text perplexity can more accurately select a more smooth and reasonable text as a final correct text and avoid misjudgment.

DETAILED DESCRIPTION OF EMBODIMENTS

Figure 1:
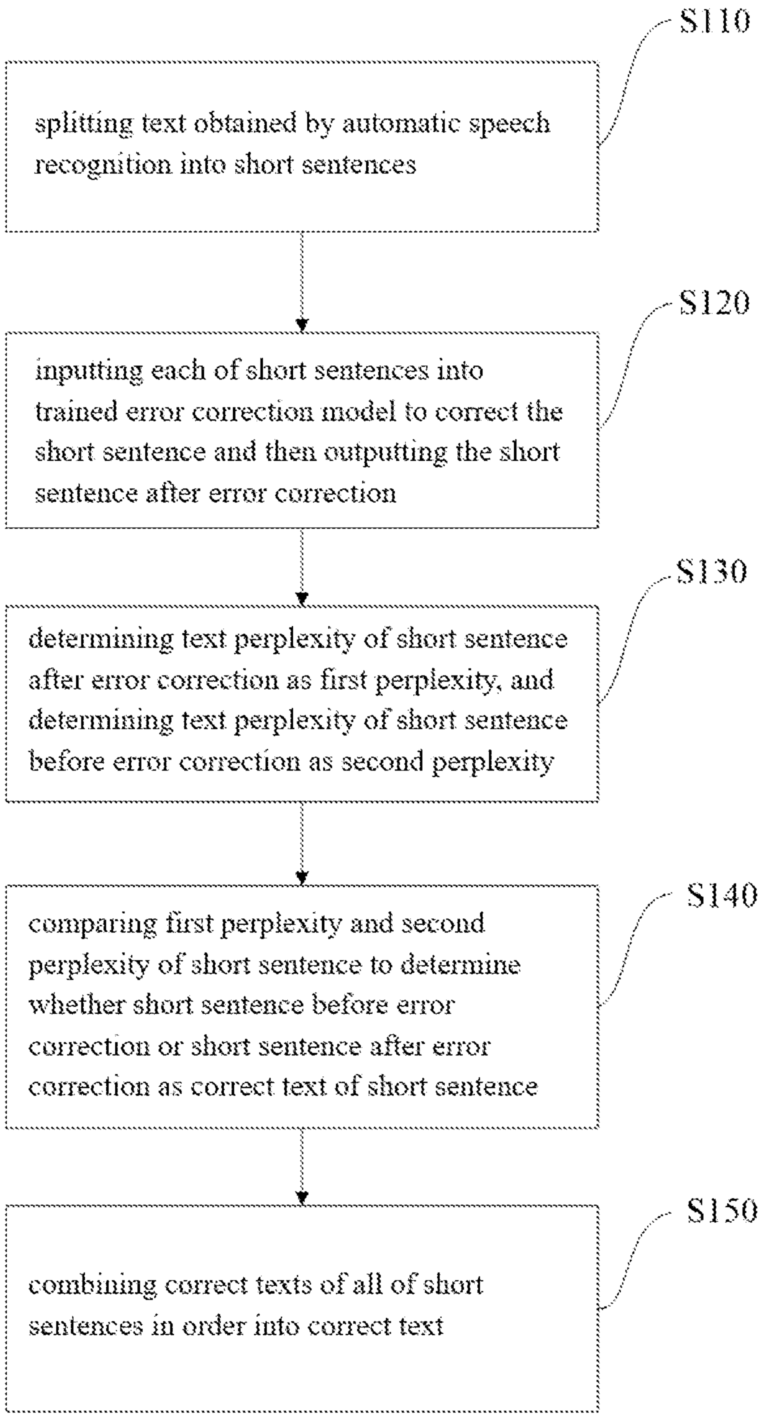
FIG. 1 is a schematic flowchart of steps S110 to S150 of an error correction method according to an embodiment of the present invention.

The accompanying drawings are for exemplary illustration only, and should not be construed as limitations on the present invention; in order to better illustrate embodiments below, certain parts in the accompanying drawings may be omitted, enlarged or reduced in size, and they do not represent the size of an actual product; for those skilled in the art, it is understandable that certain well-known structures and descriptions thereof in the drawings may be omitted.

A text error correction method is provided according to one embodiment, which use a trained end-to-end error correction model to perform text error correction. The end-to-end error correction model is built with an encoder-decoder structure, and synchronously updates relevant parameters at respective levels during training of the error correction model, thereby eliminating error accumulation between the encoder and the decoder and ensuring an accuracy of the text error correction.

FIG. 1 shows a flowchart of steps S110 to S150 of the error correction method.

In step S110 a text obtained by automatic speech recognition is split into short sentences.

In a preferred embodiment, after the text is split into the short sentences, the short sentences are numbered according to the original arrangement order in the text, so that the processed short sentences can be easily combined in correct order in subsequent steps.

In the step S120, each of the short sentences is input into the trained error correction model, error correction operations on each of the short sentences is executed by the error correction model to output a short sentence after error correction.

Figure 2:
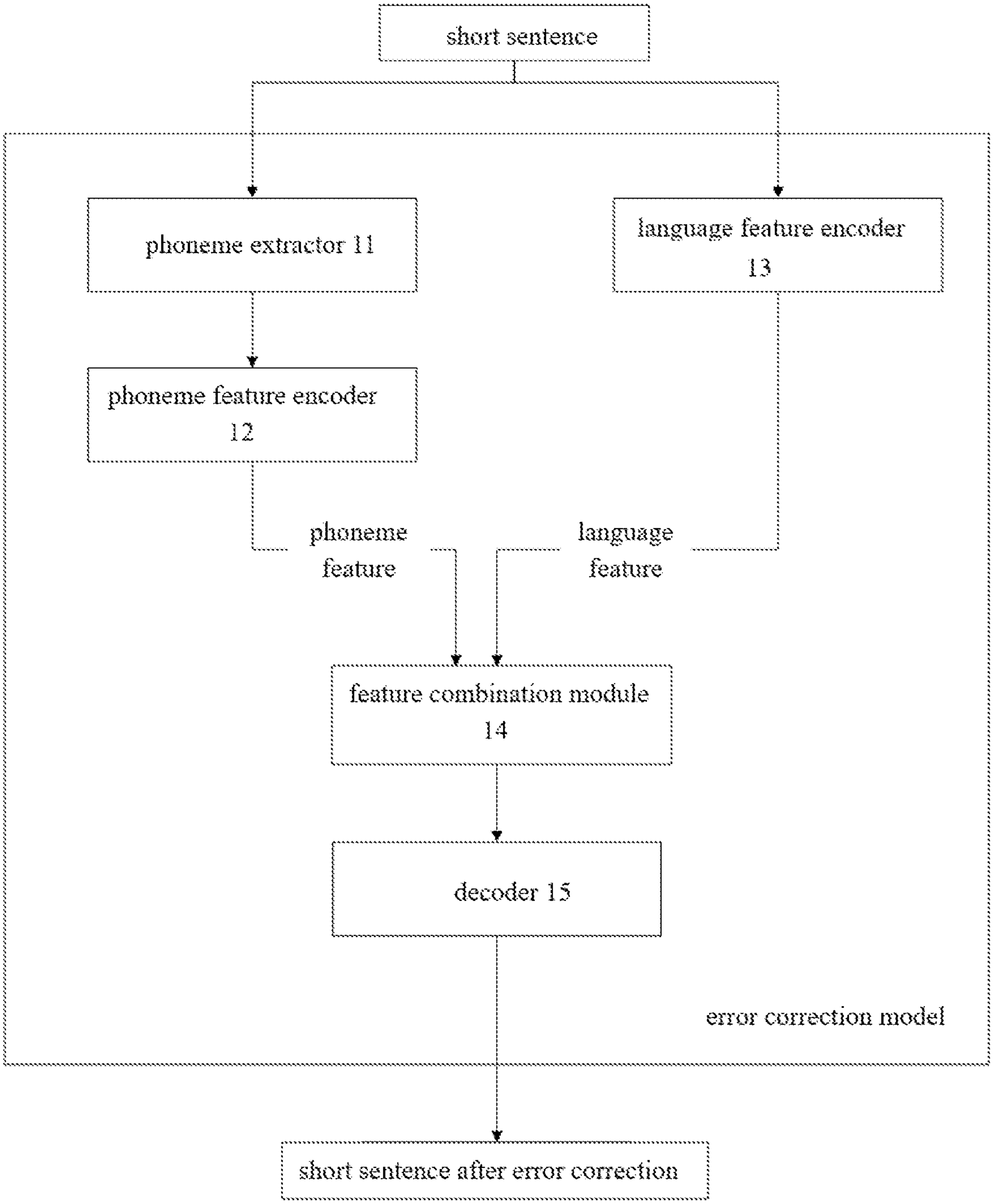
FIG. 2 is a schematic diagram showing an error correction process of an error correction model according to an embodiment of the present invention.

Referring to FIG. 2, in the present step, the error correction model includes a phoneme extractor 11, a phoneme feature encoder 12, a language feature encoder 13, a feature combination module 14, and a decoder 15. The model is trained by inputting a pre-prepared text sample into the error correction model, which is a language material used to train the error correction model.

The phoneme extractor 11, the phoneme feature encoder 12, the language feature encoder 13, the feature combination module 14, and the decoder 15 at respective levels of the error correction model synchronously update respective parameters thereof during training of the error correction model until the training is completed. The parameters refer to parameters of the respective levels, specifically refer to influencing factors or weights that need to be combined at the respective levels to implement their own function, and are used to affect output results of the respective levels.

As shown in FIG. 2, after input into the trained error correction model, the short sentence is first input into the phoneme extractor 11 and the language feature encoder 12, and finally an error correction result is output by the decoder 15. The process of the short sentence performed by the error correction model is described in detail below.

The phoneme extractor 11 acquires phoneme information of each of the short sentences and inputs the phoneme information of the short sentence into the phoneme feature encoder 12.

In this process, the phoneme information refers to information that can represent a pronunciation of the short sentence, and for example, can be pronunciation symbols suitable for representing the pronunciation of the short sentence such as Chinese Pinyin and phonetic symbols of the short sentence.

After receiving the phoneme information of the short sentence, the phoneme feature encoder 12 encodes the phoneme information of the short sentence to convert the phoneme information of the short sentence into a phoneme feature, and inputs the phoneme feature into the feature combination module 14.

In this process, the phoneme feature obtained by encoding is a vector feature that can represent the pronunciation of the short sentence. In a specific embodiment, the phoneme feature encoder 12 is a neural network encoder model, and can be implemented by a multi-layer transformer encoder (transformer refers to that a network structure is completely implemented by an attention mechanism), a recurrent neural network, and the like.

At the same time, the language feature encoder 13 encodes each of the short sentences to obtain a language feature of the short sentence, and inputs the language feature into the feature combination module 14.

In this process, the language feature obtained by encoding is a vector feature that can represent a language content of the short sentence text. In a specific embodiment, the language feature encoder 13 can be implemented by a bidirectional encoder representation from transformers (BERT) (bidirectional transformer encoder) pre-trained language model.

After receiving the phoneme feature and the language feature of the short sentence, the feature combination module 14 combines the phoneme feature and the language feature of the short sentence to obtain a combined feature of the short sentence, and inputs the combined feature of the short sentence into the decoder 15.

In this process, the feature combination module 14 specifically uses a method of vector concatenation to combine the phoneme feature and the language feature of the short sentence.

After receiving the combined feature of the short sentence, the decoder 15 decodes the combined feature of the short sentence to correct the short sentence, obtains and outputs a short sentence after error correction.

In a specific embodiment, the decoder 15 is implemented by a fully connected layer and a non-linear transformation layer, and in the specific embodiment, the decoder 15 can also be replaced by a neural network decoder model such as a transformer decoder.

In step S130, text perplexity of the short sentence after error correction is determined as first perplexity, and text perplexity of the short sentence before error correction is determined as second perplexity.

In the present step, the short sentence before error correction refers to a sentence before the short sentence is input into the error correction model. The text perplexity refers to smoothness and reasonableness of the text, and is generally used to evaluate a language model for processing text. Usually, the higher the text perplexity, the less smoothness and reasonableness the processed text is, and on the contrary, the lower the perplexity of the text, the more smoothness and reasonableness the text is. In the present step, the short sentence before error correction and the short sentence after error correction may be input into the same language model, and the text perplexity of the two texts is calculated. In the case of the same language model, the text perplexity can be used to evaluate the smoothness and the reasonableness of the input texts themselves, that is, the first perplexity and the second perplexity determined in the present step can be used to evaluate the smoothness and the reasonableness of the short sentence after error correction and the short sentence before error correction respectively.

In step S140, the first perplexity and the second perplexity of the short sentence is compared to determine the short sentence before error correction or the short sentence after error correction as a correct short sentence.

In the present step, by comparing the first perplexity and the second perplexity of the short sentence, a difference in the smoothness and the reasonableness between the short sentence after error correction and the short sentence before error correction can be determined, so that the short sentence before error correction or the short sentence after error correction can be determined as a correct short sentence.

Figure 3:
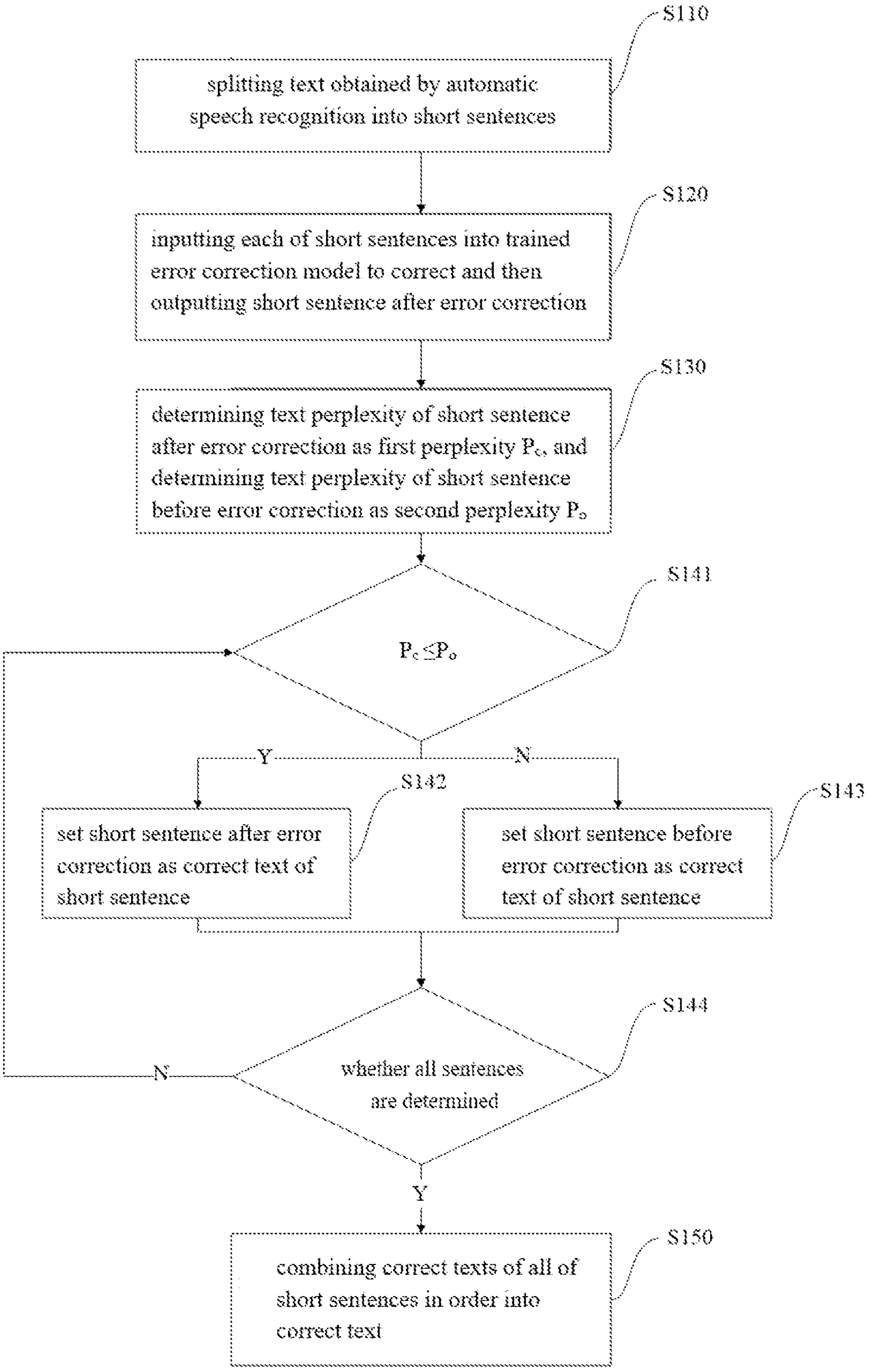
FIG. 3 is a schematic flowchart of steps S110 to S150 of the error correction method in FIG. 1, including steps S141 to S143.

In the present embodiment, if an object of the entire method is to improve the smoothness and the reasonableness of the short sentence, the short sentence with lower text perplexity is set as the correct text of the short sentence, and accordingly, as shown in FIG. 3, step S140 specifically includes steps S141-S144.

In step S141, it is determined that whether the first perplexity is equal to or less than the second perplexity of the short sentence, then executing step S142 if YES, and executing step S143 if NO.

In step S142, the short sentence after error correction is set as the correct text of the short sentence, and then step S144 is executed.

In step S143, the short sentence before error correction is set as the correct text of the short sentence, and then step S144 is executed.

In step S144, it is determined whether determination on all of the short sentences is completed, namely whether all of the short sentences have been executed step 140, continuing to execute step S141 to determine the short sentence that has not been determined if NO, and executing step S150 if YES.

In step S150, the correct texts of all of the short sentences are combined into a correct text in order.

In the present step, the short sentences obtained by splitting the text have their own order in the original text, and according to the order of the short sentences in the original text, the correct texts of the short sentences are combined into a correct text of the original text. If the short sentences obtained by splitting the text have pre-assigned numbers, the correct texts of the short sentences can be sorted according to the pre-assigned numbers, and then the correct texts are combined to obtain the correct text of the original text, which is the final result.

The text error correction method according to the present embodiment uses the trained end-to-end error correction model to perform the text error correction, and synchronously updates relevant parameters at the respective levels when training the end-to-end error correction model, and an error occurs in the upper-layer structure is corrected in downstream training, therefore, error accumulation may not occur. In addition, the processing on the text before being input into the error correction model is merely to split the text into the short sentences, and the processes of phoneme extraction, phoneme encoding, language encoding, feature combination, and decoding of the short sentences are all included in the error correction model, which ensures that the processes on the short sentences can be corrected and optimized when the end-to-end model is trained, and ensures the accuracy when using the trained error correction model to correct the error of the short sentence. Furthermore, the feature combination module of the error correction model enables the decoder to take into account error correction of a semantic feature and a pronunciation feature of the short sentence by fusing the language feature and the phoneme feature of the short sentence. Finally, the method according to the present embodiment further compares the text perplexity of the short sentence before error correction by the error correction model and the short sentence after error correction by the error correction model, and selects the short sentence with lower perplexity as the correct text of the short sentence, thereby effectively avoiding false correction.

Figure 4:
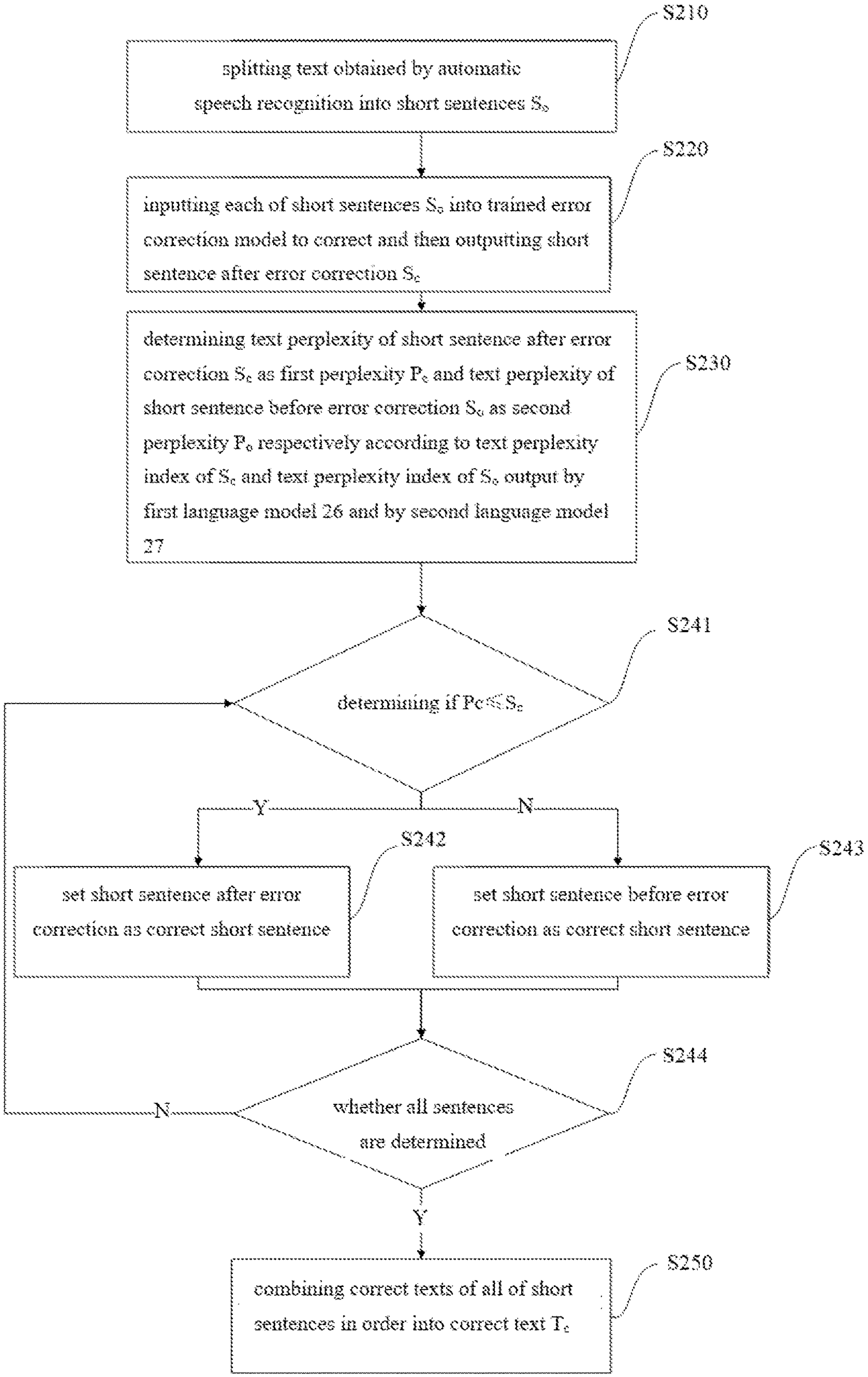
FIG. 4 is a schematic flowchart of steps S210 to S250 of an error correction method according to another embodiment of the present invention.

FIG. 4 provides a more preferred text error correction method according to another embodiment, which includes steps S210-S250.

In step S210, a text obtained by automatic speech recognition is split into short sentences $S_o$.

In step S220, each of the short sentences $S_o$ is input into the trained error correction model, error correction operations on each of the short sentences is executed by the error correction model $S_c$ to output a short sentence after error correction.

Figure 5:
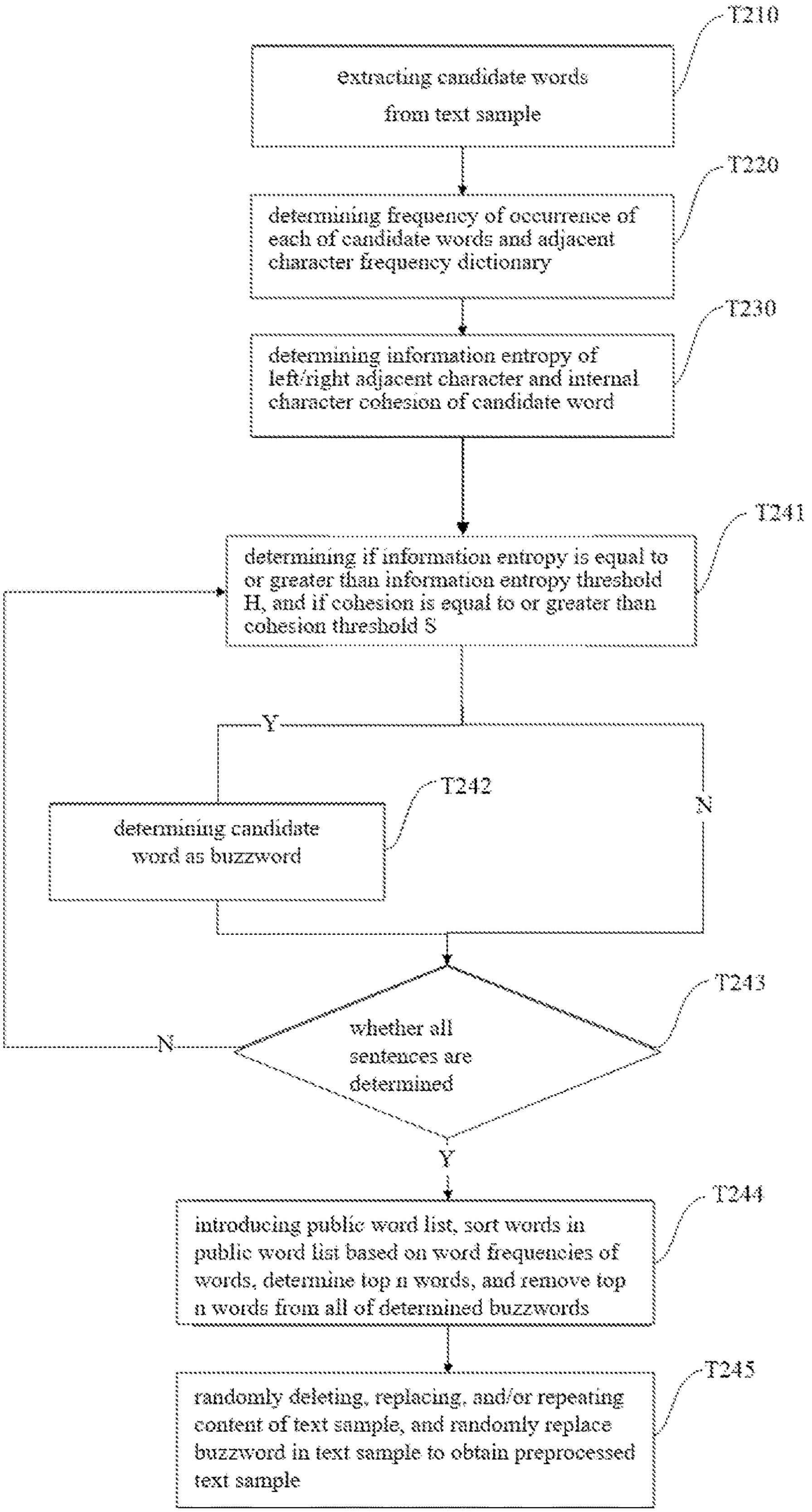
FIG. 5 is a schematic flowchart of preprocessing steps T210 to T245 of the error correction method in FIG. 4.

In the present step, the trained error correction model is obtained by inputting a pre-prepared text sample for training. The pre-prepared text sample is preprocessed before being input into the error correction model. FIG. 5 shows the preprocessing step, which will be described in detail below.

In step T210, candidate words are extracted from the text sample.

Before executing the present step, a frequency of occurrence of each of characters and an adjacent character frequency dictionary in the text sample are counted. The adjacent character frequency dictionary refers to a frequency of occurrence of an adjacent character of each character. In the present step, the candidate words of the text are extracted, and specifically, by setting a maximum word length M and a minimum word length N, the candidate words with lengths N to M can be extracted from the text sample by a method of a sliding window.

In step T220, a frequency of occurrence of each of the candidate words and the adjacent character frequency dictionary are determined.

In step T230, information entropy of the left/right adjacent character and internal character cohesion of the candidate word are determined.

In the present step, the information entropy of the left/right adjacent character of the candidate word refers to information entropy of the adjacent character on the left/right side of the candidate word in order in the text. Specifically, the information entropy of the left/right adjacent character of the candidate word can be calculated by the following formula.

$$H = -\sum_{x \in k} p(x)\log p(x)$$

in which, k represents a set of the left/right adjacent characters of the candidate words, and p(x) represents a probability of the character, which can be determined based on the adjacent character frequency dictionary obtained by pre-statistic.

The internal character cohesion of the candidate word refers to closeness between characters in the candidate word. Specifically, the internal character cohesion of the candidate word can be calculated by the following formula.

$$S = \max(p(x_1) \cdot p(x_{2,n}),\ p(x_{1,2}) \cdot p(x_{3,n}),\ \ldots\ ,\ p(x_{1,n-1}) \cdot p(x_n))$$

Here, $p(x_{i,j})$ represents a probability of segments i to j within the candidate word, which can be determined based on an occurrence probability of the candidate word obtained by pre-statistic.

In step T240, all buzzwords are determined based on the information entropy of the left and right adjacent characters internal character cohesion, and word frequencies of all of the candidate words.

In the present step, it is determined whether the candidate word is a buzzword based on the information about the adjacent characters of the candidate word and information about the candidate word itself, and a candidate word dictionary is constructed for further processing on the text sample.

Specifically, an information entropy threshold H and a cohesion threshold S can be pre-set as preliminary screening criteria for screening candidate words that are buzzwords, all of the candidate words are sorted by the word frequencies of the candidate words, which is set as a secondary screening, and the preliminary screening and secondary screening are combined to finally determine all the buzzwords. Accordingly, step T230 specifically includes steps T241-T245.

In step T241, determining whether the information entropy of the left/right adjacent character of the candidate word is equal to or greater than the information entropy threshold H, and whether the internal character cohesion of the candidate word is equal to or greater than the cohesion threshold S, then executing step T242 if YES, and executing step T243 if NO.

In step T242, determining the candidate word as the buzzword, and executing step T243.

In the present step, specifically, all of the candidate words that are determined as the buzzwords can be constructed into a first word list.

In step T243, determining whether determination on all of the candidate words is completed, and executing step T244 if YES, and if NO, continuing to execute step T241 to determine the candidate words that are not determined until the determination on all of the candidate words is completed, and then executing step T244.

In step T244, introducing a public word list, sorting the words in the public word list based on word frequencies of the words, determining the top n words, and removing the top n words from all of the determined buzzwords.

In the present step, a second word list can be constructed using the top n words in the public word list, the words in the second word list are removed from the first word list, and a third word list is constructed using the left buzzwords after removing.

The construction of the third word list can be used in subsequent steps to enhance a content of the text sample to improve an error correction ability of the error correction model for the buzzwords of the third word list.

In step T245, randomly deleting, replacing, and/or repeating the content of the text sample, and randomly replacing the buzzwords in the text sample to obtain a preprocessed text sample.

In the present step, further processing on the content of the text sample includes deleting, replacing, and/or repeating the content of the text sample with a certain probability, and at the same time, randomly replacing the buzzwords in the text sample, thereby helping the error correction model identify various types of the text and improving a generalization ability of the error correction model.

Four operations of deleting, replacing, repeating the content of the text sample, and randomly replacing the buzzwords can be selected and executed according to an actual situation.

Specifically, the process of random deletion is such that each of the characters in the text sample is randomly deleted with a certain probability $p_1$, the number of deleted characters does not exceed 30% of a total sentence length, and the proportion can be set according to an actual situation; the process of random replacement is such that each of the characters in the text sample is randomly replaced with a homophonic character or a near-sounding character with a certain probability $p_2$, the number of replaced characters does not exceed 30% of the total sentence length, and the proportion can be set according to an actual situation; and the process of random repetition is such that each of the characters in the text sample is randomly repeated and inserted into a current position with a certain probability $p_3$, the number of repeated characters does not exceed 30% of the total sentence length, and the proportion can be set according to an actual situation. Finally, when the buzzwords in the text sample are randomly replaced, the text sample is first compared with the left buzzwords after removing (third word list), and when it is detected that the text sample includes the corresponding buzzword, the buzzword is randomly replaced with a homophonic word or a near-sounding word with a probability $p_4$ higher than the $p_1$, $p_2$, and $p_3$.

Based on the text sample after the above preprocessing as training, testing, and verification sets, the error correction model is trained, and finally the trained error correction model is obtained. In a specific embodiment, the error correction model can use cross entropy of each of the characters as a loss function during the training of the error correction model, and an adaptive momentum estimation (Adam) optimization algorithm is used as a training optimizer.

Figure 6:
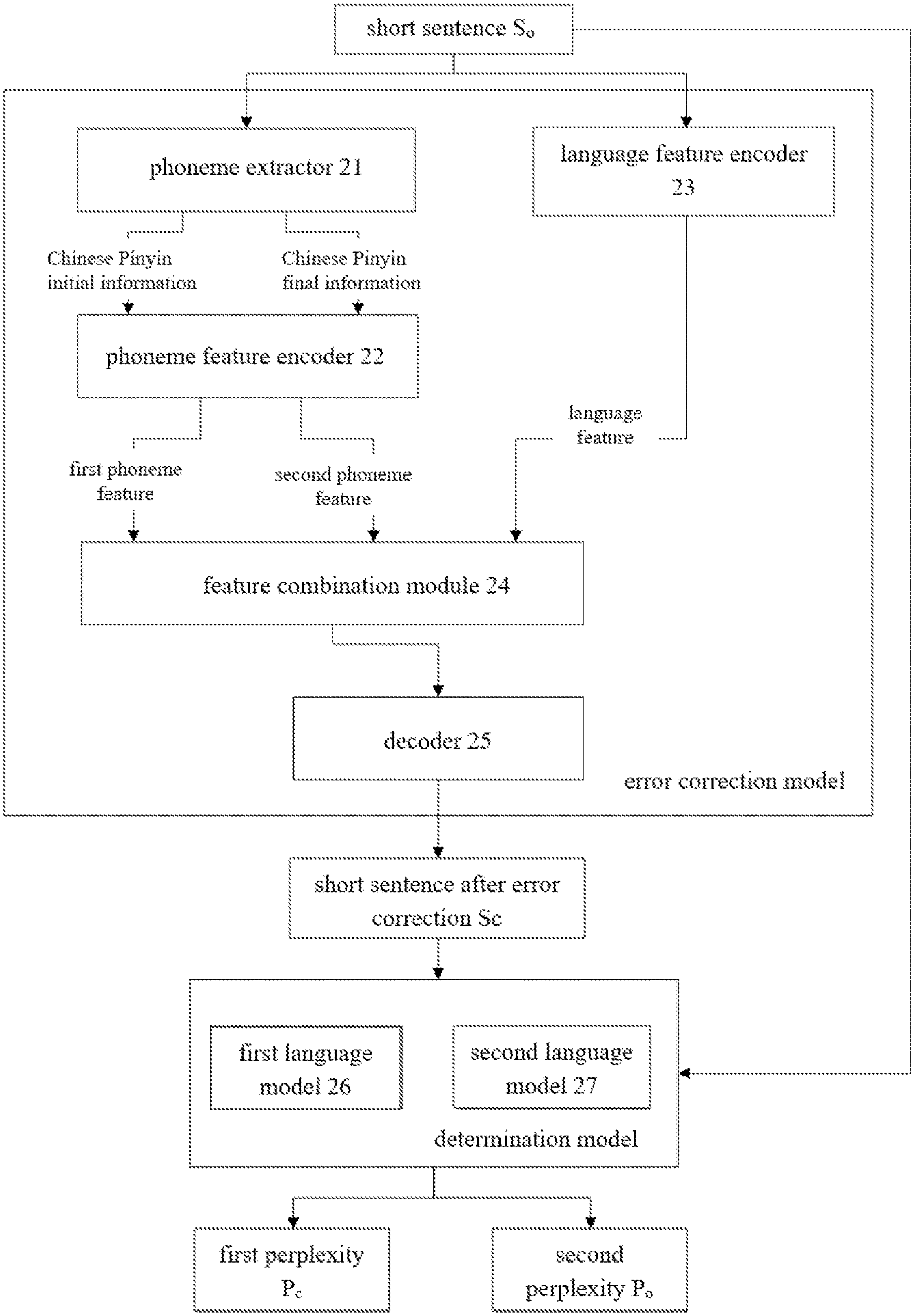
FIG. 6 is a schematic diagram showing an error correction process of an error correction model and a perplexity determination process of a determination model corresponding to the method in FIG. 4.

As shown in FIG. 6, the error correction model includes a phoneme extractor 21, a phoneme feature encoder 22, a language feature encoder 23, a feature combination module 24, and a decoder 25. The modules/models at the respective levels synchronously update the parameters thereof during the training of the error correction model until the training is completed.

After each of the short sentences $S_o$ is input into the trained error correction model, the short sentence $S_o$ is first input into the phoneme extractor 21 and the language feature encoder 22, and finally an error correction result is output by the decoder 25. The process on the short sentence $S_o$ performed by the error correction model is as follows.

The phoneme extractor 21 acquires phoneme information of the short sentence $S_o$ and inputs the phoneme information of the short sentence $S_o$ into the phoneme feature encoder 22.

In the present embodiment, the phoneme information specifically refers to Chinese Pinyin initial information and Chinese Pinyin final information of each of the characters in the short sentence $S_o$, and for example, if the short sentence $S_o$ is "hello", Chinese Pinyin of the short sentence is "ni hao", information about a Chinese Pinyin initial part is "n, h", and information about a Chinese Pinyin final part is "i, ao".

After receiving the Chinese Pinyin initial information and the Chinese Pinyin final information of the short sentence $S_o$, the phoneme feature encoder 22 encodes the Chinese Pinyin initial information of the short sentence to convert the Chinese Pinyin initial information of the short sentence $S_o$ into a first phoneme feature and to convert the Chinese Pinyin final information into a second phoneme feature, and inputs the first phoneme feature and the second phoneme feature into the feature combination module 24.

At the same time, the language feature encoder 23 encodes each of the short sentences to obtain a language feature of the short sentence $S_o$, and inputs the language feature into the feature combination module 24.

After receiving the first phoneme feature, the second phoneme feature, and the language feature of the short sentence $S_o$, the feature combination module 24 combines the first phoneme feature, the second phoneme feature, and the language feature of the short sentence $S_o$ by the method of vector concatenation to obtain a combined feature of the short sentence $S_o$, and inputs the combined feature of the short sentence $S_o$ into the decoder 25.

After receiving the combined feature of the short sentence $S_o$, the decoder 25 decodes the combined feature of the short sentence $S_o$ to correct an error of the short sentence $S_o$, and obtains a short sentence after error correction $S_c$. As shown in FIG. 6, the decoder 25 outputs the short sentence after error correction $S_c$ to a first language model 26 and a second language model 27 of the determination model.

In step S230, determining, as first perplexity $P_c$ of the short sentence $S_o$, text perplexity of the short sentence after error correction $S_c$ based on a text perplexity index of the short sentence after error correction $S_c$ output by the first language model 26 and a text perplexity index of the short sentence after error correction $S_c$ output by the second language model 27; and determining, as second perplexity $P_o$ of the short sentence $S_o$, text perplexity of the short sentence before error correction $S_o$ based on a text perplexity index of the short sentence $S_o$ output by the first language model 26 and a text perplexity index of the short sentence before error correction $S_o$ output by the second language model 27.

Each of the first language model 26 and the second language model 27 uses corpus data from different sources as a basic corpus, and uses the text perplexity as an evaluation index. In a specific embodiment, the first language model 26 is a language model with general scene corpus as basic data, and specifically, an open source corpus, that is, THUCNews can be introduced as the basic corpus of the first language model 26. The second language model 27 is a language model that uses an industrial scene corpus as basic data, and can be obtained by collecting industrial data.

In a preferred embodiment, the two language models whose basic corpuses are different languages are both bidirectional N-gram language models.

The N-gram language model is based on an N-gram algorithm, and the N-gram algorithm is based on an assumption that an i-th character/word in the text is only related to the previous i−1 character/word and has nothing to do with other characters/words. The N-gram algorithm is implemented by using a sliding window of size N to traverse the text and obtain a fragment sequence in which a size of each of fragments is N, counting conditional probabilities of characters/words in these segments with length N, and obtaining a final language model as the N-grain language model. In the present embodiment, N can be 3.

The bidirectional N-gram language model is obtained by adding a layer of a reverse N-grain structure and a layer of a forward N-gram structure, and is used to capture bidirectional text information in the short sentence. The bidirectional N-gram language model can be expressed by the following formula.

$$p(w_1, w_2 \ldots w_N) = \prod_{i=1}^{N} p(x_i) = \prod_{i=1}^{N} (p(x_i \mid x_{i-2}, x_{i-1}) + p(x_i \mid x_{i+2}, x_{i+1}))$$

Here, $p(w_1,w_2 \ldots w_N)$ represents a text probability, $p(x_i|x_{i-2},x_{i-1})$ represents a prior probability of a word $x_i$ in the text, and $p(x_i|x_{i+2}, x_{i+1})$ represents a posterior probability of the word $x_i$.

The bidirectional N-gram language model uses the text perplexity as the evaluation index, which can be expressed by the following formula.

$$P = p(w_1, w_2 \ldots w_N)^{-\frac{1}{N}} = \sqrt[N]{\frac{1}{p(w_1, w_2 \ldots w_N)}}$$

Here, P represents the text perplexity.

All of the short sentences after error correction $S_c$ output by the decoder 25 are input to the first language model 26 and the second language model 27 for processing, the first language model 26 outputs a text perplexity index $P_1(S_c)$ for each of the short sentences after error correction $S_c$, and the second language model 27 outputs a text perplexity index $P_2(S_c)$ for each of the short sentences after error correction, so that the first perplexity of the short sentence can be obtained by the following formula.

$$P_c = \theta_1 P_1(S_c) + \theta_2 P_2(S_c)$$

Here, $\theta_1$ and $\theta_2$ are pre-set fitting parameters.

The first language model 26 outputs a text perplexity index $P_1(S_o)$ for each of the short sentences before error correction $S_o$, and the second language model 27 outputs a text perplexity index $P_2$ $(S_o)$ for each of the short sentences before error correction, so that the second perplexity of the short sentence can be obtained by the following formula.

$$P_o = \theta_1 P_1(S_o) + \theta_2 P_2(S_o)$$

Here, $\theta_1$ and $\theta_2$ are pre-set fitting parameters.

In step S241, determining whether the first perplexity $P_c$ is equal to or less than the second perplexity $P_o$ of the short sentence $S_o$, and executing step S242 if YES, and executing step S243 if NO.

In step S242, setting the short sentence after error correction $S_c$ as the correct text of the short sentence $S_o$, and executing step S244.

In step S243, setting the short sentence before error correction $S_o$ as the correct text of the short sentence $S_o$, and executing step S244.

In step S244 determining whether determination on all of the short sentences $S_o$ is completed, and continuing to execute step S241 to determine the short sentence $S_o$ that has not been determined if NO, and executing step S250 if YES.

In step S250, combining the correct texts of all of the short sentences into a correct text $T_c$ in order.

The text error correction method according to the present embodiment adopts the trained end-to-end error correction model to perform the text error correction, and preprocesses the text sample by performing buzzword mining and text enhancement on the text sample before training, thereby greatly improving the error correction ability of the error correction model in dealing with various types of the text. Next, the adoption of the bidirectional N-grain language model is beneficial to capturing the bidirectional text information of the short sentence so that a more accurate perplexity index can be obtained, there are two language models used to calculate the perplexity indexes, each of the two language models uses corpus data from different sources as the basic corpus and calculates the perplexity index, the first perplexity and second perplexity of each of the short sentences are determined based on the perplexity indexes output by the two language models, and the results of the two language models are combined for calculation is benefit to improving an accuracy and credibility of the first perplexity and the second perplexity.

The text error correction method according to the present embodiment is based on the concept same as the method mentioned above, and thus, definitions, explanations, specific/preferred embodiments, and beneficial effects of steps and nouns same as those in previous embodiment can be referred to the descriptions mentioned above, and will not be described in the present embodiment.

Figure 7:
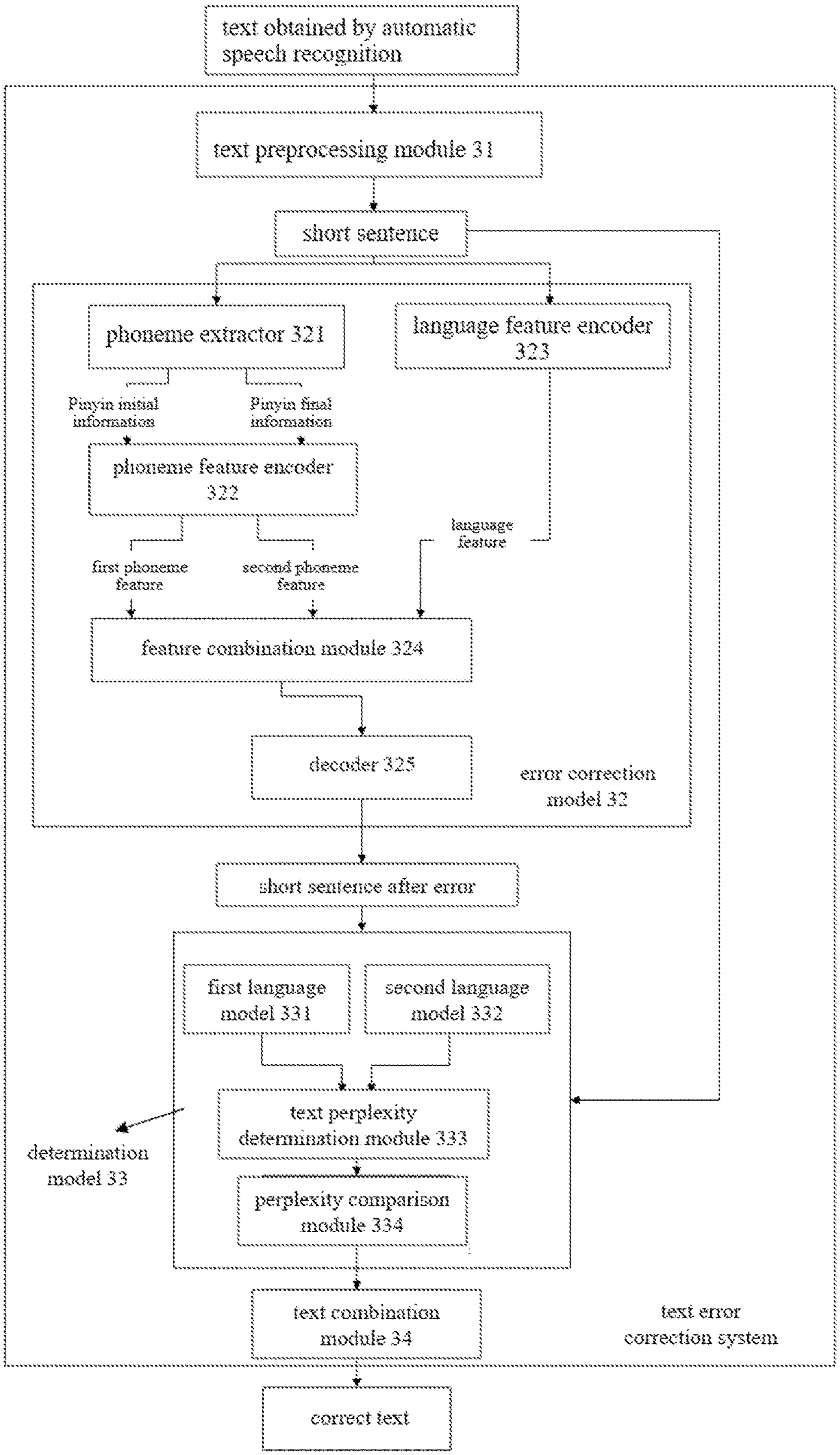
FIG. 7 is a schematic diagram showing a text error correction system according to another embodiment of the present invention.

A text error correction system is further provided, which includes a text preprocessing module 31, an error correction model 32, a determination model 33, and a text combination module 34, as shown in FIG. 7.

The text preprocessing module 31 is configured to split a text obtained by automatic speech recognition into short sentences, and input the short sentences to the trained error correction model 32.

The error correction model 32 includes a phoneme extractor 321, a phoneme feature encoder 322, a language feature encoder 323, a feature combination module 324, and a decoder 325.

Here, the error correction model 32 is a trained model which is obtained by inputting a pre-prepared text sample for training. During training of the error correction model 32, the phoneme extractor 321, the phoneme feature encoder 322, the language feature encoder 323, the feature combination module 324, and the decoder 325 synchronously update parameters thereof.

Figure 8:
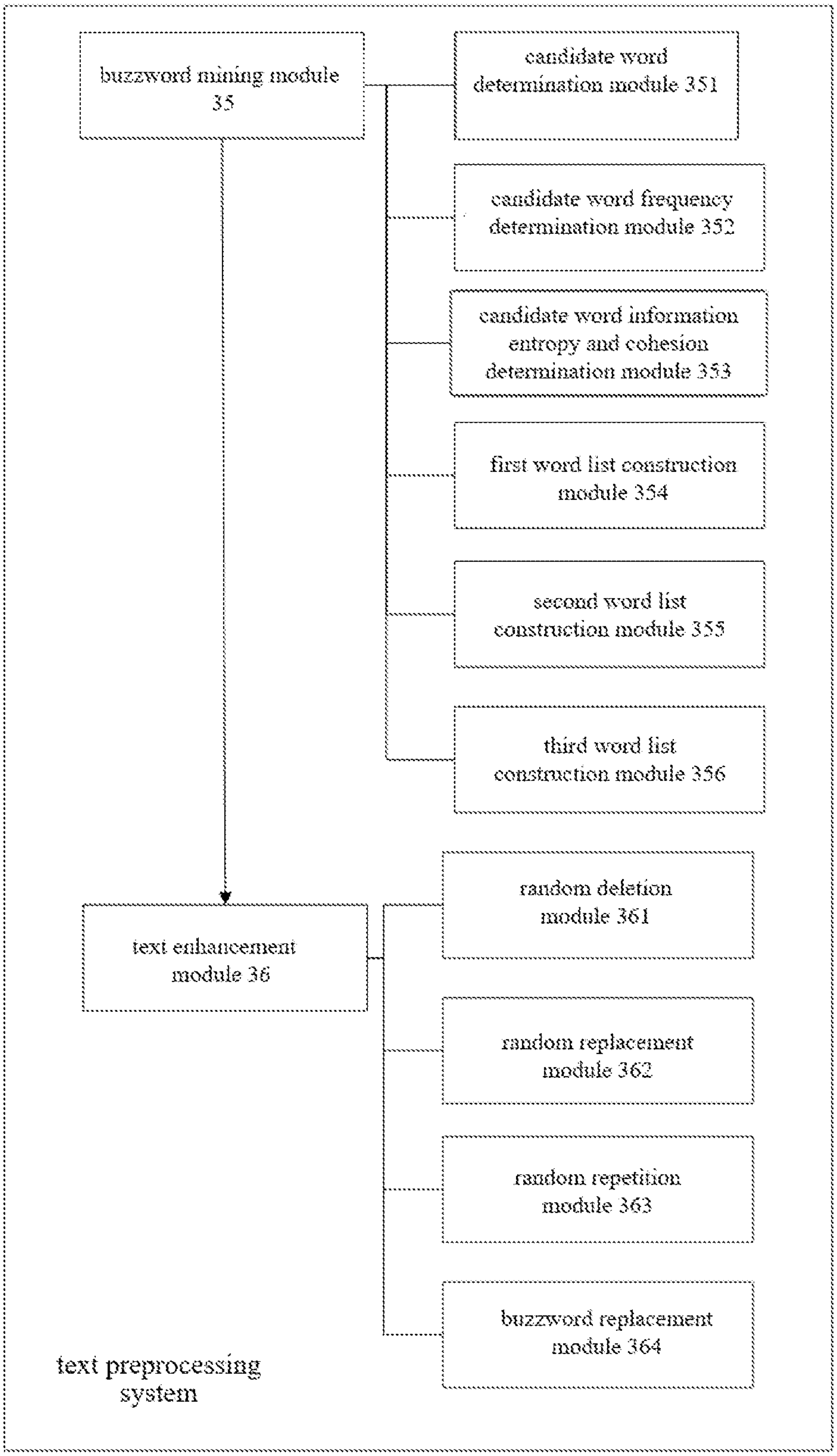
FIG. 8 is a schematic diagram showing a text preprocessing system in FIG. 7.

In a preferred embodiment, the pre-prepared text sample needs to be pre-processed before being input into the error correction model. As shown in FIG. 8, the text preprocessing system can preprocess the text sample, and includes a buzzword mining module 35 and a text enhancement module 36.

The buzzword mining module 35 specifically includes the following modules.

A candidate word determination module 351 is configured to extract candidate words with lengths N to M from the text sample by a method of sliding window by setting the maximum word length M and the minimum word length N.

A candidate word frequency determination module 352 is configured to determine a frequency of occurrence of each of the candidate words and an adjacent character frequency dictionary.

A candidate word information entropy and cohesion determination module 353 is configured to determine information entropy of a left/right adjacent character and internal character cohesion of each of the candidate words. Specifically, the information entropy of the left/right adjacent character of the candidate word can be calculated by a formula, that is, $H=-\Sigma_{x\in k}\, p(x) \log p(x)$. The internal character cohesion of the candidate word can be calculated by a formula, that is, $$S = \max(p(x_1)\cdot p(x_{2,n}),\ p(x_{1,2})\cdot p(x_{3,n}),\ \ldots\ ,\ p(x_{1,n-1})\cdot p(x_n)).$$

A first word list construction module 354 is configured to determine whether the information entropy of the left/right adjacent character of the candidate word is equal to or greater than the information entropy threshold H, and whether the internal character cohesion of the candidate word is equal to or greater than the cohesion threshold S. If YES, the first word list construction module 354 determines the candidate word as a buzzword and continues to determine the candidate word whose determination is not completed, and if NO, the first word list construction module 354 continues to determine the candidate word which has not been determined until determination on all of the candidate words is completed, and constructs the first word list for all of the candidate words which are determined as the buzzwords.

A second word list construction module 355 is configured to introduce a public word list, sort words in the public word list based on word frequencies of the words, determine the top n words, remove the top n words from all of the determined buzzwords, and construct the second word list by using the top n words in the public word list.

A third word list construction module 356 is configured to remove the word in the second word list from the first word list, and construct the third word list by using the left buzzwords after removing.

The text enhancement module 36 specifically includes the following modules.

A random deletion module 361 is configured to randomly delete each of the characters in the text sample with the certain probability $p_1$, the number of deleted characters does not exceed 30% of the total sentence length, and the proportion can be set according to an actual situation.

A random replacement module 362 is configured to randomly replace each of the characters in the text sample with a homophonic character or a near-sounding character with the certain probability $p_2$, the number of replaced characters does not exceed 30% of the total sentence length, and the proportion can be set according to an actual situation.

A random repetition module 363 is configured to randomly repeat each of the characters in the text sample and insert the character into a current position with the certain probability $p_3$, the number of repeated characters does not exceed 30% of the total sentence length, and the proportion can be set according to an actual situation.

A buzzword replacement module 364 is configured to compare the words in the text sample based on the third word list constructed by the third word list construction module 356, and when it is detected that the text sample includes the buzzword, the buzzword replacement module 364 randomly replaces the buzzword with a homophonic word or a near-sounding word with the probability $p_4$ that is higher than the $p_1$, $p_2$, and $p_3$.

Based on the text sample after the above preprocessing as training, testing, and verification sets, the error correction model is trained, and finally the trained error correction model 32 is obtained.

In the trained error correction model 32, when the text preprocessing module 31 inputs the short sentences obtained by splitting the text into the error correction model 32, the phoneme extractor 321 first processes the short sentence as follows.

The phoneme extractor 321 is configured to acquire the phoneme information of each of the short sentences, and input the phoneme information of the short sentence into the phoneme feature encoder 322, and is further configured to directly input each of the short sentences into the language feature encoder 323 and the determination model 33.

Specifically, the phoneme extractor 321 is configured to obtain Chinese Pinyin initial information and Chinese Pinyin final information of each of the short sentences, and input the Chinese Pinyin initial information and the Chinese Pinyin final information of the short sentence into the phoneme feature encoder 322.

The phoneme feature encoder 322 is configured to encode the phoneme information of each of the short sentences to convert the phoneme information of the short sentence into a phoneme feature of the short sentence.

Specifically, the phoneme feature encoder 322 is configured to encode the Chinese Pinyin initial information of each of the short sentences to covert the Chinese Pinyin initial information of the short sentence into a first phoneme feature and convert the Chinese Pinyin final information into a second phoneme feature, and input the first phoneme feature and the second phoneme feature into the feature combination module 324.

The language feature encoder 323 is configured to encode each of the short sentences to obtain a language feature of the short sentence.

The feature combination module 324 is configured to combine the first phoneme feature, the second phoneme feature, and the language feature of each of the short sentences to obtain a combined feature of the short sentence, and input the combined feature of each of the short sentences into the decoder 325.

The decoder 325 is configured to decode the combined feature of each of the short sentences to correct an error of the short sentence to obtain a short sentence after error correction, and is further configured to input each of the short sentences after error correction into the determination model 33.

The determination model 33 specifically includes a first language model 331, a second language model 332, a text perplexity determination module 333, and a perplexity comparison module 334.

Each of the two language models uses corpus data from different sources as basic corpus. In a specific embodiment, the first language model 331 uses a general scene corpus as the basic data, and the second language model 332 uses an industrial scene corpus as the basic data.

The first language model 331 is configured to output text perplexity indexes of the short sentence before error correction and the short sentence after error correction.

The second language model 332 is configured to output text perplexity indexes of the short sentence before error correction and the short sentence after error correction.

The short sentence before error correction is input by the text preprocessing module 31, and the short sentence after error correction is input by the decoder 325.

Specifically, the first language model 331 and the second language model 332 are both bidirectional N-gram language models. Each of the bidirectional N-gram language models can be expressed by the following formula.

$$p(w_1, w_2 \ldots w_N) = \prod_{i=1}^{N} p(x_i) = \prod_{i=1}^{N} (p(x_i \mid x_{i-2}, x_{i-1}) + p(x_i \mid x_{i+2}, x_{i+1}))$$

Here, $p(w_1, w_2 \ldots w_N)$ represents a text probability, $p(x_i|x_{i-2},x_{i-1})$ represents a prior probability of a word $x_i$ in the text, and $p(x_i|x_{i+2},x_{i+1})$ represents a posterior probability of the word $x_i$.

The bidirectional N-gram language model uses the text perplexity as the evaluation index, which can be expressed by the following formula.

$$P = p(w_1, w_2 \ldots w_N)^{-\frac{1}{N}} = \sqrt[N]{\frac{1}{p(w_1, w_2 \ldots w_N)}}$$

Here, P represents the text perplexity.

The text perplexity determination module 333 is configured to determine first perplexity of the short sentence corresponding to the short sentence after error correction based on the text perplexity indexes of the short sentence after error correction output by the first language model 331 and second language model 332, and determine second perplexity of the short sentence corresponding to the short sentence before error correction based on the text perplexity indexes of the short sentence before error correction output by the first language model 331 and the second language model 332.

Specifically, the first perplexity of the short sentence can be calculated by the following formula.

$$P_c = \theta_1 P_1(S_c) + \theta_2 P_2(S_c)$$

Here, $P_1(S_c)$ represents the text perplexity index, output by the first language model 331, of the short sentence after error correction of the short sentence, $P_2(S_c)$ represents the text perplexity index, output by the second language model 332, of the short sentence after error correction of the short sentence. $\theta_1$ and $\theta_2$ are pre-set fitting parameters.

The second perplexity of the short sentence can be calculated by the following formula.

$$P_o = \theta_1 P_1(S_o) + \theta_2 P_2(S_o)$$

Here, $P_1(S_o)$ represents the text perplexity index, output by the first language model 331, of the short sentence before error correction of the short sentence, $P_2(S_o)$ represents the text perplexity index, output by the second language model 332, of the short sentence before error correction of the short sentence. $\theta_1$ and $\theta_2$ are pre-set fitting parameters.

The perplexity comparison module 334 is configured to determine whether the first perplexity is equal to or less than the second perplexity of the short sentence, and determine the short sentence after error correction as a correct text of the short sentence if YES, and determine the short sentence before error correction as a correct text of the short sentence if NO.

The text combination module 34 is configured to combine the correct texts of all of the short sentences in order into a correct text.

The text error correction system according to the present embodiment is based on the concept same as those of the embodiments mentioned above, and thus, definitions, explanations, specific/preferred embodiments, and beneficial effects of steps and nouns same as those in the embodiments mentioned above can be refer to the descriptions mentioned above, and will not be described in the present embodiment.

A computer device is further provided, including a storage and a processor, in which the storage stores a computer program, and the processor implements the text error correction method mentioned above when executing the computer program.

The present embodiment further provides a computer-readable storage medium storing a computer program, in which the text error correction method mentioned above is implemented when the computer program is executed by a processor.

Obviously, the embodiments of the present invention described above are merely examples for clearly illustrating the technical solutions of the present invention, rather than limiting the implementation modes of the present invention. Any modifications, equivalent replacements and improvements made within the spirit and principles of the present invention shall be included within the protection scope of the claims of the present invention.

The invention claimed is:

1. A text error correction method, comprising:

splitting a text obtained by automatic speech recognition into a plurality of short sentences; and executing error correction operations on each of the short sentences, comprising inputting one short sentence of the short sentences as a pre-error correction short sentence into a trained error correction model, wherein the error correction model includes a phoneme extractor, a phoneme feature encoder, a language feature encoder, a feature combination module, and a decoder, which provide data to update respective parameters thereof during training of the error correction model by inputting a text sample into the error correction model;

acquiring, by the phoneme extractor, phoneme information of the short sentence;

converting, by the phoneme feature encoder, the phoneme information into a phoneme feature through encoding the phoneme information;

obtaining, by the language feature encoder, a language feature of the short sentence through encoding the short sentence;

combining, by the feature combination module, the phoneme feature and the language feature to obtain a combined feature of the short sentence;

decoding, by the decoder, the combined feature to conduct error correction on the short sentence, and obtaining an error corrected short sentence as a result of the conducted error correction applied upon the short sentence, determining a first value representative of text perplexity of the error corrected short sentence as first perplexity, determining a second value representative of text perplexity of the pre-error correction short sentence as second perplexity, comparing the first perplexity of the error corrected short sentence and the second perplexity of the pre-error correction short sentence, determining, based on a result of the comparison, whether the pre-error correction short sentence or the error corrected short sentence as a correct short sentence, repeatedly conducting the error correction for subsequent short sentences from the short sentences, and combining the correct short sentence of each of the short sentences in order into a correct text, after all of the short sentences executed error correction operations, wherein the method of determining the text perplexity of the error corrected short sentence as the first perplexity includes:

inputting the error corrected short sentence into two language models trained based on different corpuses, the two language models outputting text perplexity indexes of the error corrected short sentence, and obtaining, as the first perplexity, the text perplexity of the error corrected short sentence based on the text perplexity indexes output by the two language models;

wherein the method of determining the text perplexity of the pre-error correction short sentence as the second perplexity includes:

inputting the pre-error correction short sentence into the two language models trained based on different corpuses, the two language models outputting text perplexity indexes of the pre-error correction short sentence, and obtaining, as the second perplexity, the text perplexity of the pre-error correction short sentence based on the text perplexity indexes output by the two language models, and wherein each of the language models uses the text perplexity as an evaluation index.

2. The text error correction method according to claim 1, wherein the two language models trained based on different corpuses are both bidirectional N-gram language models, and each of the bidirectional N-gram language models is obtained by adding a layer of a reverse N-gram structure and a layer of a forward N-gram structure, wherein the N represents a positive integer.

3. The text error correction method according to claim 1, wherein the method of comparing the first perplexity and the second perplexity to determine whether the error corrected short sentence or the pre-error correction short sentence as the correct short sentence includes:

determining whether the first perplexity is equal to or less than the second perplexity, setting the error corrected short sentence as the correct short sentence if YES, and setting the pre-error correction short sentence as the correct short sentence if NO.

4. The text error correction method according to claim 1, wherein the phoneme information includes Chinese Pinyin initial information and Chinese Pinyin final information, and the phoneme feature includes a first phoneme feature and a second phoneme feature, wherein the method of acquiring, by the phoneme extractor, the phoneme information of the short sentence and converting, by phoneme encoding, the phoneme information into the phoneme feature includes: acquiring the Chinese Pinyin initial information and the Chinese Pinyin final information of the short sentence, and converting the Chinese Pinyin initial information into a first phoneme feature and converting the Chinese Pinyin final information into a second phoneme feature by phoneme encoding, and wherein the method of combining the phoneme feature and the language feature to obtain the combined feature includes: combining the first phoneme feature, the second phoneme feature, and the language feature to obtain the combined feature.

5. The text error correction method according to claim 1, wherein the text sample for training of the error correction model is preprocessed by operations of:

extracting candidate words from the text sample, determining information entropy of left and right adjacent characters and internal character cohesion of each of the candidate words, determining all buzzwords based on the information entropy of the left and right adjacent characters and the internal character cohesion of all of the candidate words, and randomly deleting, replacing, and/or repeating a content of the text sample, and randomly replacing the buzzwords in the text sample to obtain a preprocessed text sample.

6. A text error correction system, comprising: a processor configured to execute a program stored in a storage, the program including a text preprocessing module, an error correction model, a determination model, and a text combination module, wherein the text preprocessing module is configured to split a text obtained by automatic speech recognition into short sentences, and input each of the short sentences as a pre-error correction short sentence to a trained error correction model, the error correction model includes a phoneme extractor, a phoneme feature encoder, a language feature encoder, a feature combination module, and a decoder, which provide data to update respective parameters thereof during training of the error correction model by inputting a text sample into the error correction model, the phoneme extractor is configured to acquire phoneme information of each of the short sentences, and input the phoneme information of each short sentence into the phoneme feature encoder, and is further configured to directly input each short sentence into the language feature encoder and the determination model, the phoneme feature encoder is configured to encode the phoneme information of each of the short sentences to convert the phoneme information of each short sentence into a phoneme feature thereof, the language feature encoder is configured to encode each of the short sentences to obtain a language feature thereof, the feature combination module is configured to combine the phoneme feature and the language feature of each of the short sentences to obtain a combined feature thereof, and input the combined feature of each of the short sentences into the decoder, the decoder is configured to decode the combined feature of each of the short sentences to conduct an error correction to obtain an error corrected short sentence as a result of the conducted error correction applied upon the short sentence, and is further configured to input the error corrected short sentence into the determination model, the determination model is configured to determine a first value representative of text perplexity of the error corrected short sentence of each short sentence as first perplexity thereof, and determine a second value representative of text perplexity of the pre-error correction short sentence of each short sentence as second perplexity thereof, and is further configured to compare the first perplexity of the error corrected short sentence and the second perplexity of the pre-error correction short sentence to determine, based on a result of the comparison, whether the pre-error correction short sentence or the error corrected short sentence as a correct short sentence, and to repeatedly conduct the error correction for subsequent short sentences from the short sentences, the text combination module is configured to combine the correct short sentence of each of the short sentences in order into a correct text, the determination model includes two language models trained based on different corpuses, a first perplexity determination module, a second perplexity determination module, and a correct text determination module, each of the language models using the text perplexity as an evaluation index, each of the language model is configured to determine text perplexity indexes of each error corrected short sentence inputted by the decoder, and text perplexity indexes of each pre-error correction short sentence inputted by the text preprocessing module, the first perplexity determination module is configured to obtain, as the first perplexity of each short sentence, the text perplexity of each error corrected short sentence based on the text perplexity indexes thereof output by the two language models, the second perplexity determination module is configured to obtain, as the second perplexity of each short sentence, the text perplexity of each pre-error correction short sentence based on the text perplexity indexes thereof output by the two language models, and the correct text determination module is configured to compare the first perplexity of the error corrected short sentence and the second perplexity of the pre-error correction short sentence to determine whether the pre-error correction short sentence or the error corrected short sentence as the correct text of the respective short sentence.

7. A computer device, comprising a storage and a processor, wherein the storage stores a computer program executable by the processor to perform the text error correction method according to claim 1.

8. A non-transitory computer-readable storage medium, which stores a computer program executable by a processor to perform the text error correction method according to claim 1.

* * * * *